US008819760B2

(12) United States Patent
Balram et al.

(10) Patent No.: US 8,819,760 B2
(45) Date of Patent: *Aug. 26, 2014

(54) METHODS AND SYSTEMS FOR IMPROVING LOW-RESOLUTION VIDEO

(75) Inventors: Nikhil Balram, Mountain View, CA (US); Gwyn Edwards, Mountain View, CA (US); Sanjay Garg, Bangalore (IN)

(73) Assignee: Marvell World Trade Ltd., St. Michael (BB)

( * ) Notice: Subject to any disclaimer, the term of this patent is extended or adjusted under 35 U.S.C. 154(b) by 34 days.

This patent is subject to a terminal disclaimer.

(21) Appl. No.: 13/599,459

(22) Filed: Aug. 30, 2012

(65) Prior Publication Data

US 2012/0320265 A1    Dec. 20, 2012

Related U.S. Application Data

(63) Continuation of application No. 11/969,705, filed on Jan. 4, 2008, now Pat. No. 8,269,886.

(60) Provisional application No. 60/878,967, filed on Jan. 5, 2007.

(51) Int. Cl.
*H04N 7/16* (2011.01)

(52) U.S. Cl.
USPC .......................................... 725/139; 725/151

(58) Field of Classification Search
USPC ........... 348/441, 445–446, 454; 725/151, 139
See application file for complete search history.

(56) References Cited

U.S. PATENT DOCUMENTS

| 5,383,144 | A | 1/1995 | Kato |
|---|---|---|---|
| 5,828,786 | A | 10/1998 | Rao et al. |
| 5,974,193 | A | 10/1999 | Baudouin |
| 6,647,152 | B2 | 11/2003 | Willis et al. |
| 6,724,433 | B1 | 4/2004 | Lippman |
| 7,233,362 | B2 | 6/2007 | Wu |
| 2002/0080882 | A1 | 6/2002 | Kitagawa |
| 2002/0103007 | A1 | 8/2002 | Jaggers et al. |
| 2002/0118296 | A1 | 8/2002 | Schwab et al. |
| 2004/0136686 | A1 | 7/2004 | Kono et al. |

(Continued)

FOREIGN PATENT DOCUMENTS

| EP | 0 639 923 | 2/1995 |
|---|---|---|
| EP | 1 032 217 | 8/2000 |

(Continued)

OTHER PUBLICATIONS

Combettes et al., "Estimating First-Order Finite-Difference Information in Image Restoration Problems," 2004 International Conference on Image Processing (ICIP), International Conference on Singapore, Oct. 24-27, 2004, Piscataway, NJ, XP-010784819, pp. 321-324.

(Continued)

*Primary Examiner* — Hunter B Lonsberry

(57) ABSTRACT

Systems and methods are provided for improving the visual quality of low-resolution video displayed on large-screen displays. A video format converter may be used to process a low-resolution video signal from a media providing device before the video is displayed. The video format converter may detect the true resolution of the video and deinterlace the video signal accordingly. For low-resolution videos that are also low in quality, the video format converter may reduce compression artifacts and apply techniques to enhance the appearance of the video.

20 Claims, 15 Drawing Sheets

(56) References Cited

U.S. PATENT DOCUMENTS

| | | |
|---|---|---|
| 2004/0257434 A1 | 12/2004 | Davis et al. |
| 2005/0046746 A1 | 3/2005 | Choi |
| 2005/0225564 A1 | 10/2005 | Shan |
| 2005/0244135 A1* | 11/2005 | Yahata et al. ............ 386/52 |
| 2006/0140268 A1 | 6/2006 | Ha et al. |
| 2006/0152627 A1 | 7/2006 | Ruggiero et al. |
| 2006/0192891 A1* | 8/2006 | Maier et al. ............ 348/448 |
| 2008/0198264 A1 | 8/2008 | Balram |

FOREIGN PATENT DOCUMENTS

| | | |
|---|---|---|
| EP | 1 244 301 | 9/2002 |
| EP | 1 401 210 | 3/2004 |
| EP | 1 551 181 | 7/2005 |
| EP | 1 560 438 | 8/2005 |
| EP | 1 638 329 | 3/2006 |
| EP | 1 677 533 | 7/2006 |
| WO | WO 2005/076595 | 8/2005 |
| WO | WO 2005/107272 | 11/2005 |
| WO | WO 2006/020119 | 2/2006 |
| WO | WO 2006/109863 | 10/2006 |
| WO | WO 2006/109863 A1 * | 10/2006 ............ H04N 9/808 |
| WO | WO 2006/113776 | 10/2006 |

OTHER PUBLICATIONS

Suwendi et al., "Nearest-neighbor and Bilinear Resampling Factor Estimation to Detect Blockiness or Blurriness of an Image," Proceedings of the Digital Publishing Conference, San Jose, Ca., Jan. 16, 2006, SPIE—International Society for Optical Engineering, XP-002492588, vol. 6076, Jan. 2006, pp. 6076C-1-6076C-8.

Chao, Teh-Tzong et al. "Motion-Compensated Spatio-Temporal Interpolation for Frame Rate Up-Conversion of Interlaced or Progressive Image Sequence" Proc. SPIE, vol. 2308, pp. 682-693, Chicago, IL (Sep. 29, 1994).

* cited by examiner

METHODS AND SYSTEMS FOR IMPROVING LOW-RESOLUTION VIDEO

CROSS-REFERENCE TO RELATED APPLICATIONS

This application is a continuation of U.S. patent application Ser. No. 11/969,705, filed Jan. 4, 2008, now U.S. Pat. No. 8,269,886, which claims the benefit under 35 U.S.C. §119(e) of U.S. Provisional Application No. 60/878,967, filed Jan. 5, 2007, which are incorporated herein by reference in their entireties.

BACKGROUND OF THE INVENTION

With the increasing use of portable media players, such as MP3 players with video capability, videos are now commonly created for use with these devices. For example, online stores are providing movies, television episodes, and other video content for download to portable media devices. The video content provided for these devices may have video characteristics that are suitable for display on the small display screens of these portable devices.

Another form of video content that is also becoming popular is online video. In particular, many television shows and movies are readily available for download on demand. Furthermore, many users share user-generated videos to the public through various video-sharing websites. Conventionally, these Internet-provided videos are displayed on personal computer (PC) or laptop monitors, where screen sizes are relatively small. Therefore, online video, as well as videos generated for portable media players, typically have lower resolution.

In addition to having lower resolution, user-generated videos on the Internet are often created by amateurs who are unfamiliar with or unable to use professional techniques in video-generation. For example, user-generated videos may be filmed on hand-held video cameras. Thus, due to the shaking camera, the frame-by-frame video may change even for unchanging backgrounds. For a given data rate, this causes a disproportionate amount of compressed video data to be used on backgrounds and other still images. For this and other reasons, user-generated content often suffers not only from low resolution, but also from artifacts. Artifacts are referred to herein as visually displeasing portions in a display that are caused by video compression. Common artifacts include blocking artifacts and mosquito noise. Blocking artifacts refer to the blocky appearance of a low resolution video that is typically seen on areas of less detail in the image. Mosquito noise is a ringing effect, caused by truncating high-frequency luminance and/or chrominance coefficients, typically seen around sharp edges in the video.

With improvements in technology, and in particular networking, Internet content and portable media player content may be displayed on other devices, such as on television screens. However, these other devices may have larger screens, and therefore higher resolution, than that of the video content provided by the Internet or portable media players. Therefore, when videos with lower resolution, and in some cases with compression artifacts, are blown up to a larger size, the picture quality may become unacceptably poor, creating an unpleasant viewing experience for a user.

Furthermore, processing techniques performed by large-screen display devices when preparing a video signal for display on the device may worsen the presentation of low-resolution video. One such processing technique performed by display devices is deinterlacing, a process that changes the way that pixels are drawn on a screen. Videos are displayed by a display device by drawing successive images at fast enough rate (e.g., 50 frames per second). Typically, a display presents these images pixel by pixel using either a progressive or interlaced scan. A progressive scan draws out each pixel in an image from the top of the screen to the bottom. Thus, after each scan, a progressive display displays an entire frame. An interlaced scan, on the other hand, draws out the odd pixel lines in an image. Then, at the next time instant, the even pixel lines are drawn out. An interlaced scan, therefore, creates a video by alternating between displaying the odd lines and displaying the even lines of successive images. These half-resolution images are called fields.

Currently, many display devices (e.g., some digital televisions, liquid crystal displays (LCDs), etc.) are progressive displays. However, video transmission standards, such as television broadcast standards, commonly use interlacing. Therefore, these display devices often include deinterlacing circuitry for converting interlaced videos to progressive videos. There are several different deinterlacing techniques employed by digital display devices. These techniques attempt to display an interlaced video with the highest possible visual quality. Thus, to effectively display television broadcasts and other interlaced videos, the deinterlacing circuitry in televisions and other display devices are becoming increasingly complex and sophisticated.

In general, because of these deinterlacing and other new, sophisticated techniques for effectively processing higher-resolution video signals, viewers have come to expect vivid and high-quality images on their television sets. In particular, these techniques are being incorporated into regularly available television sets for displaying large images with higher brightness, contrast, and resolution. However, these complex processing techniques may not be effective when performed on low-resolution, and possibly low-quality, videos, such as content from the Internet or portable media players. In fact, these techniques may worsen the presentation of low-resolution videos. Therefore, there is currently no effective way to present both higher-resolution video content, such as television broadcasts, and low-resolution video content, such as Internet content, on a large-screen device. Thus, it would be desirable to improve the visual quality of low-resolution video on large-screen displays.

SUMMARY OF THE INVENTION

Accordingly, systems and methods are provided for improving the visual appearance of low-resolution video displayed on high-resolution, large-screen devices.

In accordance with one aspect of the invention, a video format converter is used to process a low-resolution video before it is processed by a large-screen device. Often times, low-resolution video is transmitted using a video transmission standard for higher resolution videos, so the low-resolution video appears to possess a higher resolution that it actually has. Thus, to determine whether to deinterlace and/or process the video signal using a low-resolution technique, the video format converter may detect the true resolution of the video content. In some embodiments, if the video converter detects that the video is low-resolution and interlaced, the video converter's deinterlacer may deinterlace the received video signal using a technique determined based on the true resolution. In other embodiments, the video converter's deinterlacer may convert the received video signal to its true resolution and deinterlace the converted video signal. Either way, the video converter produces a progressive video signal (e.g., in HDMI or DVI format, etc.). Therefore, the deinterlacing circuitry of the large-screen device, which may be unsuitable for low-resolution video, is avoided.

In accordance with another aspect of the present invention, the video format converter may take additional processing steps to improve the appearance of low-resolution videos that are also low in quality. In some embodiments, to determine whether a video signal needs additional processing, the video converter may look for a low-quality signature in the video signal. If the video converter determines that a video signal is low-quality, it first reduces the artifacts in the video signal using, among other techniques, MPEG noise reduction for reducing mosquito noise and blocking artifacts. After noise reduction, the video signal is left with very little information. The reduced video signal is then enhanced to improve the appearance of the noise-reduced video. In some embodiments, enhancing the video signal involves increasing the contrast of the picture. In some embodiments, enhancing the video signal involves adding film grain to create the illusion of texture and to cover up deficiencies in the picture. These and other techniques for enhancing the video signal improve the visual perception of a viewer when there is little detail in the picture.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
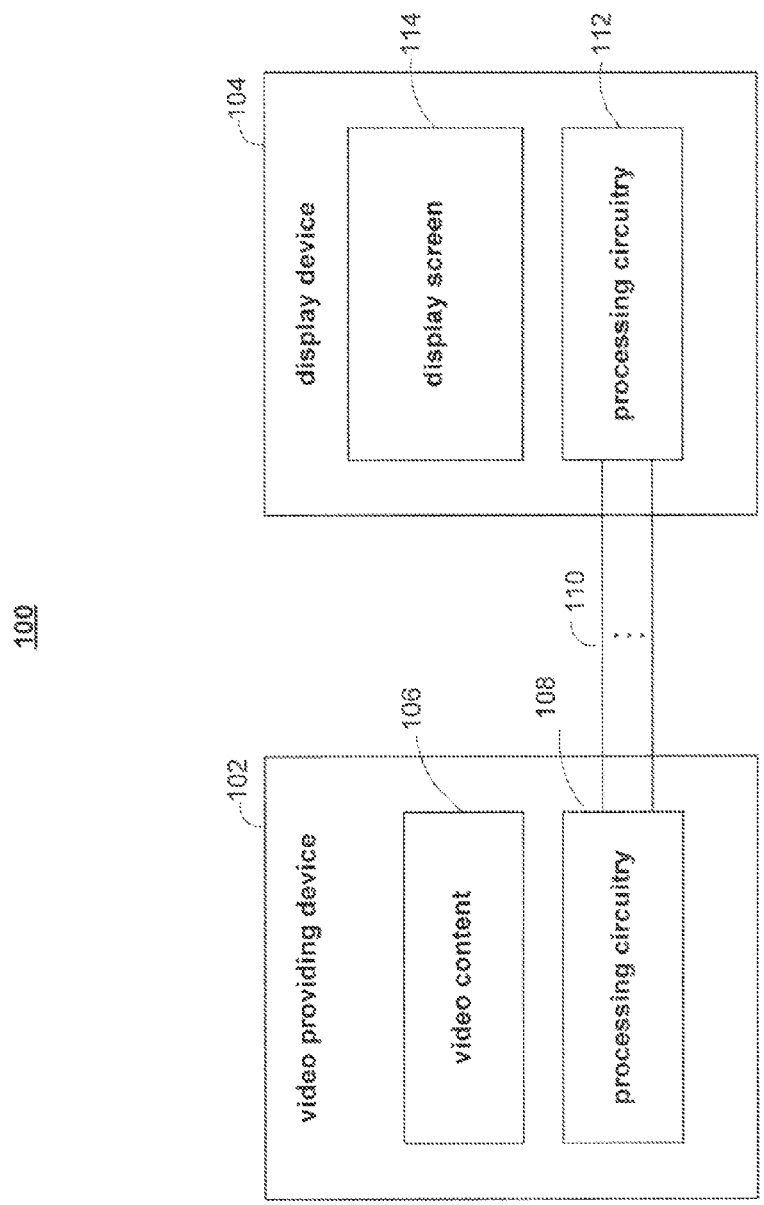
FIG. 1 shows a video providing device coupled to a display device.

FIG. 1 shows illustrative system 100 for providing video content to a display device. Display device 104 in system 100 may be a television or any other device that can display video. Video content 106 may be provided by video providing device 102. Video providing device 102 may be a portable media player, a DVD player, a set top box, or any other suitable device that may provide video. Video content 106 may be stored in memory within video providing device 102, or video providing device 102 may obtain video content 106 directly from an external source (e.g., the Internet, a DVD, etc.). Video content 106 may have any suitable resolution (e.g., 320×240, 160×120, 640×480, etc.), may use any suitable encoding (e.g., uncompressed, H.264, MPEG, etc.), and may have any other suitable video characteristics.

Video providing device 102 includes processing circuitry 108. Processing circuitry 108 converts media content 106 into a video signal suitable for transmission to display device 104. The video signal may be of any suitable format. For example, the video signal may be in composite video, S-Video, or component video (e.g., YPbPr, RGB, etc.) format. The video signal may utilize a digital format such as a high-definition multimedia interface (HDMI) or digital video interface (DVI) format. Processing circuitry 108 may include an encoder to map video content 106 to a video signal of a given video transmission standard. Processing circuitry 108 may include, for example, National Television Systems Committee (NTSC), phase alternating line (PAL), or SECAM encoders. For simplicity, when appropriate, "video content" and "video signal" may hereinafter be used interchangeably. For example, a "low-resolution video signal" refers to a video signal corresponding to low-resolution video content.

The video signals from processing circuitry 108 may be transmitted to display device 104 using link 110. Link 110 may be one or more cables or other wired connections. Link 110 may also be a wireless connection. The transmitted video signal is received from link 110 by display device 104. Display device 104 may include processing circuitry 112 and display screen 114. Display screen 114 displays video content 106 to a user. Display screen 114 may have any suitable resolution (e.g., 640×480, 1280×720, 1920×1080, etc.). Processing circuitry 112 processes the video signal received from link 110 and prepares the video for display on display screen 114. Processing circuitry 112 may process the video signal based on the resolution and other characteristics of display screen 114, and may attempt to improve the visual quality of the video.

For progressive displays, or displays that show full frames at each time instant, processing circuitry 112 includes circuitry to deinterlace interlaced video. An interlaced video is one that is composed of two types of fields: an odd field consisting of the odd lines of pixels in an image and an even field consisting of the even lines in a image. To create an interlaced video, the two types of fields are displayed in an alternating fashion at each time interval (e.g., every 16.67 milliseconds for NTSC, every 20 milliseconds for PAL, etc.). Thus, odd fields are displayed at every other time interval, and even fields are displayed in the remaining time intervals. Since only half the pixels in a display are utilized at any given time instant, an interlaced video has at most half the resolution of the display. A progressive video, on the other hand, may utilize up to the full resolution of the display. Converting an interlaced video to a progressive video involves a process referred to as deinterlacing. Deinterlacing involves determining odd pixel lines in an even field and/or determining even pixel lines in an odd field using incomplete information. More properties of display device 104 will be discussed below in connection with FIG. 2.

Figure 2:
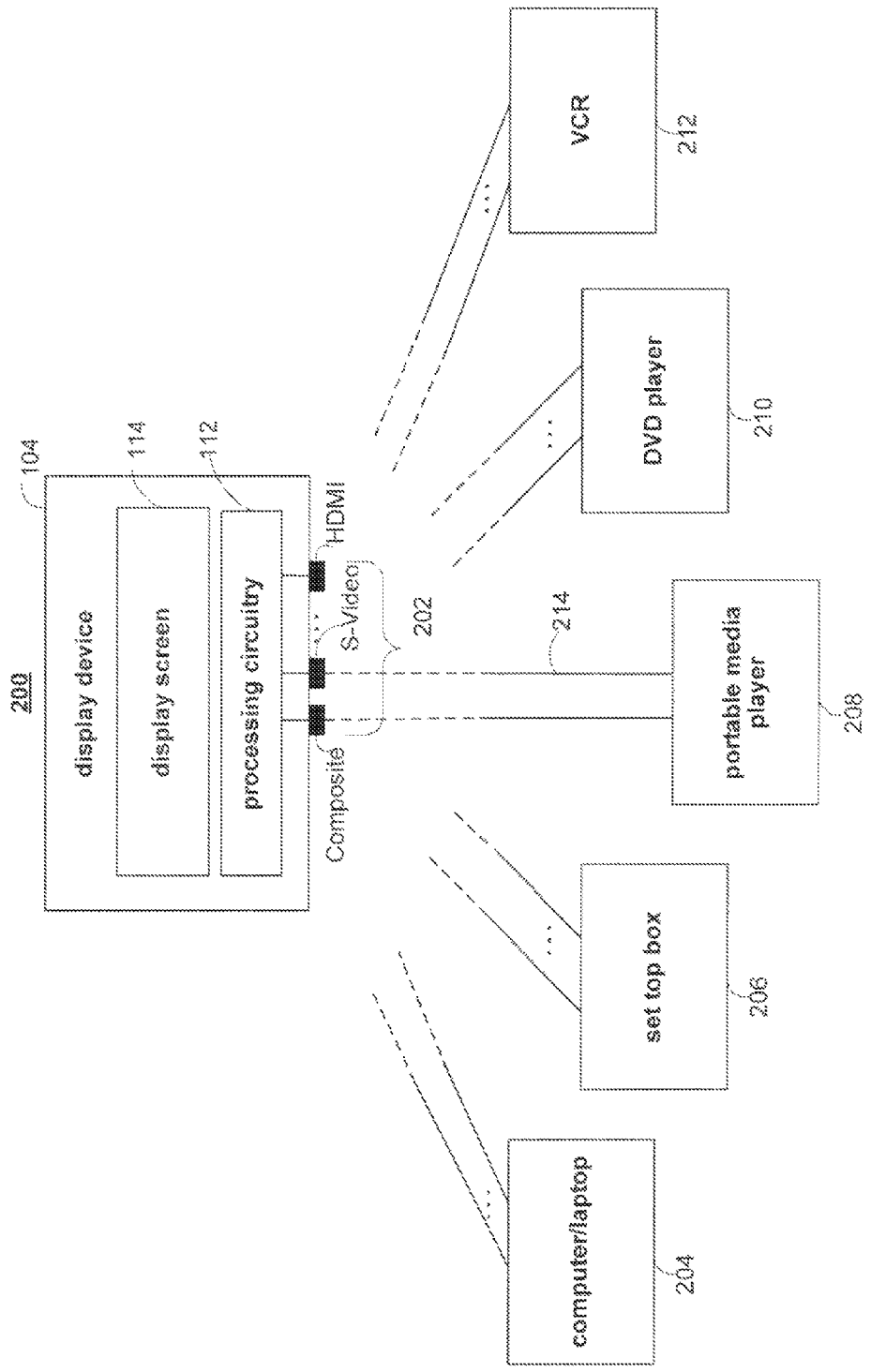
FIG. 2 illustrates a number of video providing devices that may connect to a display device.

System 200 in FIG. 2 is an illustrative system that includes multiple types of video providing devices. The video providing devices in system 200 can include portable media player 208 (e.g., video MP3 player, video-ready mobile phone, etc.), DVD player 210, set top box 206, video cassette recorder (VCR) 212, and computer/laptop device 204. It should be understood that any other type of video providing device may be included in system 200, and therefore system 200 is not limited to the video providing devices shown in FIG. 2. For example, system 200 may include video providing devices other than DVD player 210 that support removable digital disks (e.g., HD-DVD and Blu-ray disks). Thus, although reference is made to DVDs in various embodiments throughout this disclosure, it should be understood that these embodiments may be applied to HD-DVD and Blu-ray.

Figure 4:
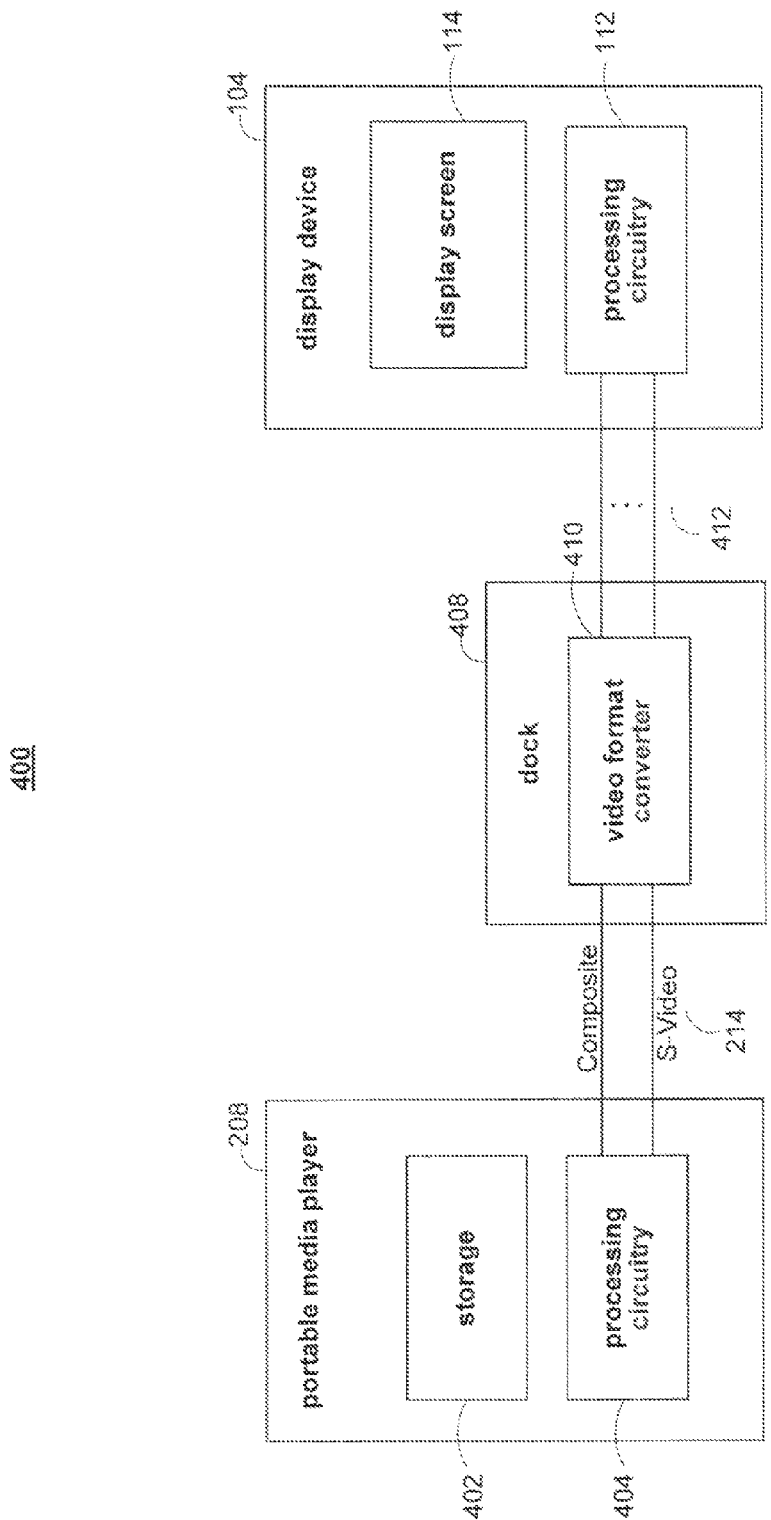
FIG. 4 illustrates a system using a dock or other hardware for processing a video signal.

Each video providing device in system 200 may support one or more of the formats and standards described above in connection with FIG. 1, or any other suitable format or standard. For instance, portable media player 208 may provide video signals in composite and S-Video formats via link 214. Link 214 may include any number of wired (e.g., cables, etc.) or wireless links. While portable media player 208 is shown in FIGS. 2 and 4 to provide video signals in composite and S-Video formats, this is merely one illustrative example. In some embodiments, portable media player 208 may support other suitable output formats instead of or in addition to composite and S-Video, such as any of the formats discussed above in connection with FIG. 1. For example, portable media player 208 may support component video that is either interlaced or progressive, and/or may support one or more digital video interfaces, such as HDMI or DVI.

As shown in FIG. 2, display device 104 may have one or more sockets/interfaces 202 (not pictured in FIG. 1) to receive video signals, where each interface may support one or more of the video formats described above in connection with FIG. 1. For example, display device 104 may have separate input sockets for composite video, S-Video, component video, HDMI, and DVI. Therefore, any video providing device in system 200 may provide video content via one or more of sockets 202. If link 214 is wireless, sockets/interfaces 202 may be a network interface. In system 200, portable media player 208 is shown to be coupled to display device 104 through the composite video and S-Video sockets, but any of the other video providing devices may be coupled to display device 104 using one or more of these or other sockets. Thus, multiple types of video providing devices may provide video content to display device 104 using the same interface.

Processing circuitry 112 (FIG. 2) receives a video signal from one of sockets 202. Processing circuitry 112 processes the received video signal to display video content on display screen 114. For example, for an interlaced video signal, processing circuitry 112 may use 3-dimensional (3D) deinterlacing to convert a received video signal to a progressive format. 3D deinterlacing may obtain full frames from half-resolution fields by spatial interpolation (e.g., pixel replication, averaging neighboring pixels, etc.) and/or by temporal combining (e.g., combining an odd and even field, etc.). Thus, 3D deinterlacers may utilize all relevant information (e.g., spatial and temporal) in order to deinterlace a video signal. This processing technique is suitable for videos that are already somewhat high-resolution and high-quality, such as videos meant for display on a television (e.g., a television broadcast received by set top box 206, a commercial movie from DVD player 210, etc.).

However, the characteristics of video content often vary depending on the type of video providing device. Although many devices provide high-resolution (e.g., 720×480) and high-quality (professionally-generated) videos, many video providing devices may provide lower-resolution (e.g., 320× 240, 160×120, etc.) and/or lower-quality (e.g., amateur-generated) videos. For example, portable media player 208, due to its small screen size, may provide videos that have low resolution. Computer/laptop device 204 and set top box 206 may provide Internet content, which are often low-resolution and/or user-generated. Furthermore, any of the video providing devices shown in system 200 (FIG. 2) may provide video content that is highly compressed, and therefore low in quality. In general, due to the variety of video providing devices and video compression/encoding algorithms, the resolution and quality of videos provided to display device 104 may vary considerably. Processing circuitry 112, however, is typically not aware of the origins of a video signal, and may therefore process a low-resolution video signal in substantially the same way as a high-resolution signal. These processing techniques, such as the above-described 3D deinterlacing technique, may not be as effective for low-resolution video signals. In fact, in some instances, applying processing techniques intended for high-resolution video may actually reduce the visual quality of a low-resolution video signal.

Figure 3:
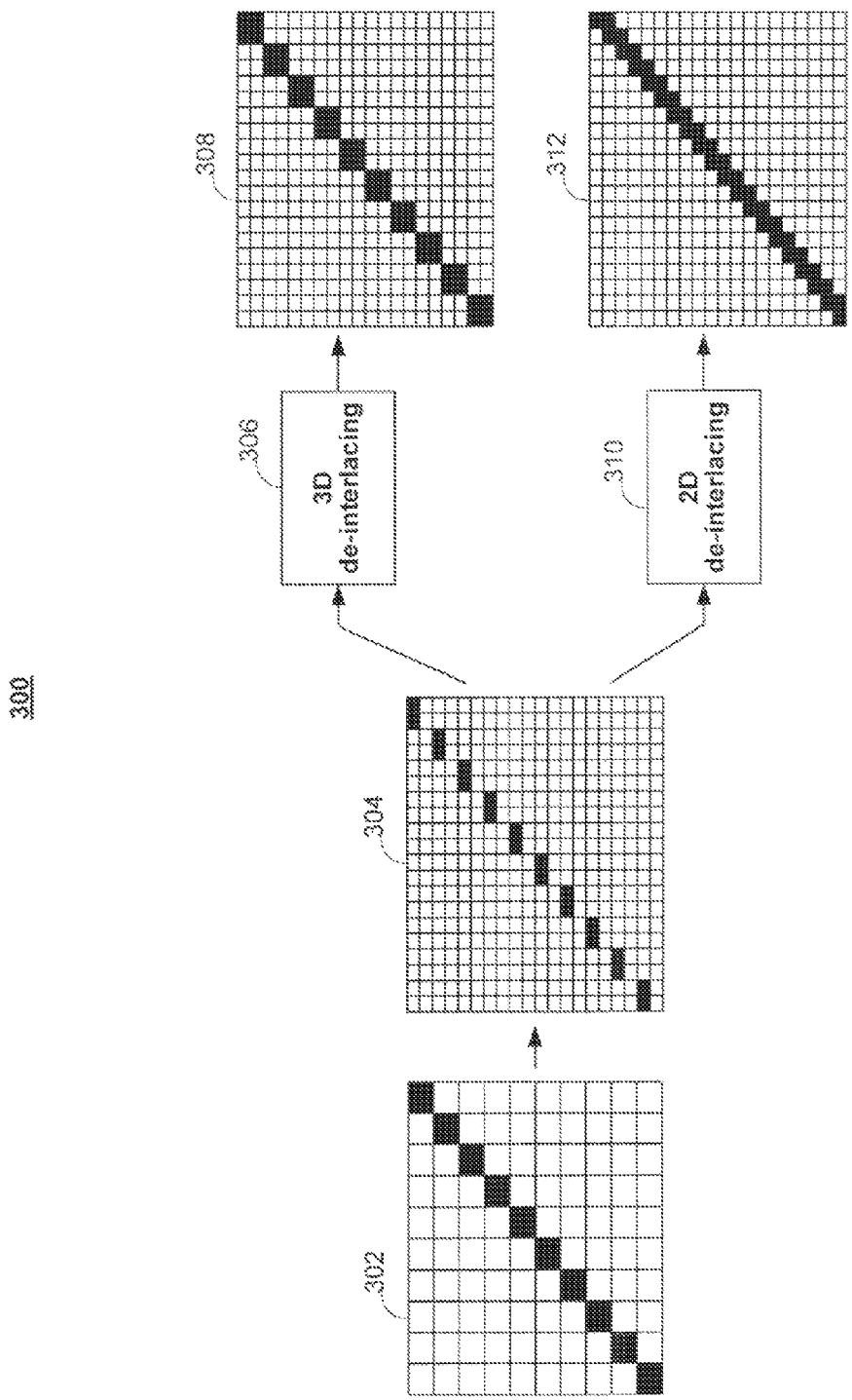
FIG. 3 illustrates the difference between 2-dimensional (2D) and 3-dimensional (3D) deinterlacing.

FIG. 3 illustrates one adverse affect that may result from using the 3D deinterlacing circuitry of display device 104 for a low-resolution video provided by, for example, portable media player 208. Portable media player 208 may store and display videos that have a low resolution such as 320×240. One frame (or two combined fields) of a 320×240 still video is represented by image/frame 302, where each square represents a pixel. That is, image 302 represents a series of unchanging images in a video, such that the resulting video is unmoving for a period of time. In the event that a user wants to watch a video stored in portable media player 208 on another display device (e.g., display device 104), the video content may be transmitted as a video signal through link 214. In some embodiments, the transmitted video signal is of a standard format that requires the video signal to be transmitted at a higher resolution (e.g., 640×480). Thus, portable media player 208 may simply increase (e.g., double) the number of lines and the number of pixels in each line. Image 304 represents the odd field of image 302 after conversion to 640×480. The even field is the same as the odd field. Clearly, image 304 does not have 640×480 resolution even though it is being transmitted as such. Processing circuitry 112 of display device 104, unaware of the origins of the video signal, may blindly apply 3D deinterlacing at 306 as if the video were a true 640×480-resolution video. Processing circuitry 112, therefore, notices that the video is unchanging in successive time instances, and combines the odd and even fields. For a normal 640×480 video, the combination would produce a full-resolution frame with complete information. 3D deinterlacing for the 320×240 video transmitted as 640×480, however, produces image 308. Note that image 308 is not an improvement upon the original image 302, and displayed on a larger scale, is visibly jagged and blocky.

For a low resolution video transmitted with a higher resolution standard, 2D deinterlacing may produce results that have better visual quality. 2D deinterlacing does not utilize temporal information to interpolate, and instead interpolates unknown pixels based on surrounding, known pixels. This form of deinterlacing may be more appropriate for the 320× 240 video transmitted at 640×480, since no information is gained from combining the odd and even field. In some embodiments, 2D deinterlacing may involve vector interpolation, where edges in each image (e.g., the outline of objects, etc.) are determined, the angles of the edges are calculated, and unknown pixels are interpolated from neighboring pixels lying along the calculated edge angles. Performing 2D deinterlacing with vector interpolation at 310 may result in image 312. Image 312 may be an improvement over image 308, because the jagged and blocky edges have been visibly smoothened. Vector interpolation and its functionalities are described in greater detail in Sahu et al. U.S. patent application Ser. No. 11/294,709, which is hereby incorporated by reference herein in its entirety.

Therefore, to improve the presentation of low-resolution and potentially low-quality videos, the video signals corresponding to low-resolution videos may be processed prior to reception by processing circuitry 112 (FIG. 1). Instead of directly feeding a video signal from a video providing device to display device 104, as shown in FIGS. 1 and 2, the video signal may first be processed by a video format converter. In some embodiments, the video format converter may be embedded in a device external to both the video providing device and the display device. FIG. 4 shows illustrative system 400 that utilizes such an external device, e.g., dock 408. Low-resolution video content may be provided by portable media player 208, which is one type of video providing device 102. The low-resolution video content may be stored in storage 402 within the portable media player. Processing circuitry 404 may convert the stored video content into video signals using any of the techniques described in connection with processing circuitry 108 in FIG. 1. The video signals may be transmitted to dock 408 through link 214. Converter 410 may convert video signals from link 214 to video signals 412 that, when displayed on display device 104, will be more visually pleasing. In some embodiments, video format converter 410 may convert composite video or S-Video outputs from link 214 into a progressive format at 412, such as HDMI. Therefore, video format converter 410 may perform deinterlacing using a technique that is appropriate for the particular resolution and quality of a video signal. For the example discussed above in connection with FIG. 3, video format converter 410 may deinterlace the video signal using 2D rather than 3D deinterlacing. Therefore, because the video is transmitted to display device 104 using a progressive format, the potentially unsuitable deinterlacing circuitry of display 104 may be avoided.

Dock 408 may additionally contain circuitry or functionalities other than video format converter 410. If link 214 is wireless, dock 408 may contain a network interface to receive and process a wireless video signal. In some embodiments, a received video signal may be in a compressed format (e.g., H.264, MPEG4, VC-1, MPEG2, etc.). Dock 408 may therefore include circuitry that decompresses the compressed video signal and provides the decompressed video signal to video converter 410. In some embodiments, dock 408 may support receiving multiple video formats using one link (e.g., one cable, a wireless link). Then, dock 408 may additionally include a multi-format decoder (not pictured). The multi-format decoder may pre-process a received video signal based on the format of the video. For example, decoding a video signal may involve decompressing a compressed video signal according to the type of compression used, as described above.

In some embodiments, dock 408 in FIG. 4 is designed for a specific type of portable media player (e.g., a video MP3 player). For example, dock 408 may include an interface for coupling the portable media player to the device. This interface may be shaped to only accept input from one brand or one type of portable media player. Alternatively, the interface may include a proprietary connector. In other embodiments, the interface for dock 408 may support a set of portable media players, a set of DVD players, a set of computer/laptop devices, or a set of any other type of video providing device. In still other embodiments, dock 408 may support a set of video providing devices (e.g., all video providing devices that provide NTSC, etc.). Thus, the invention described herein is not limited to a portable media player, but may be applied to any device that provides low-resolution video. It should therefore be understood that dock 408 can include any type of interface (e.g., physical connector, network, proprietary, etc.) for coupling an electronic device to the dock.

Furthermore, video format converter 410 (FIG. 4) and any other circuitry described in connection with dock 408 need not be embedded in a device that is external to a video providing device and a display device. In some embodiments, video format converter 410 may be part of processing circuitry 112 (FIG. 1) in display device 104. For example, video format converter 410 may be embedded within a television, and may selectively process received video signals based on the resolution and/or quality of the video. Alternatively, video format converter 410 may process all received video signals regardless of the resolution/quality. In other embodiments, video format converter 410 may be part of the processing circuitry in a video providing device. For example, video format converter 410 may be embedded in a computer/laptop device, and may selectively process video signals prior to transmission based on the resolution and/or quality of the video. Alternatively, video format converter 410 may process all video signals prior to transmission regardless of the resolution/quality. The video format converter embedded in a device may be enabled or disabled by a user (e.g., by pushing a button on a television remote, by selecting a setting on a computer, etc.).

Figure 5:
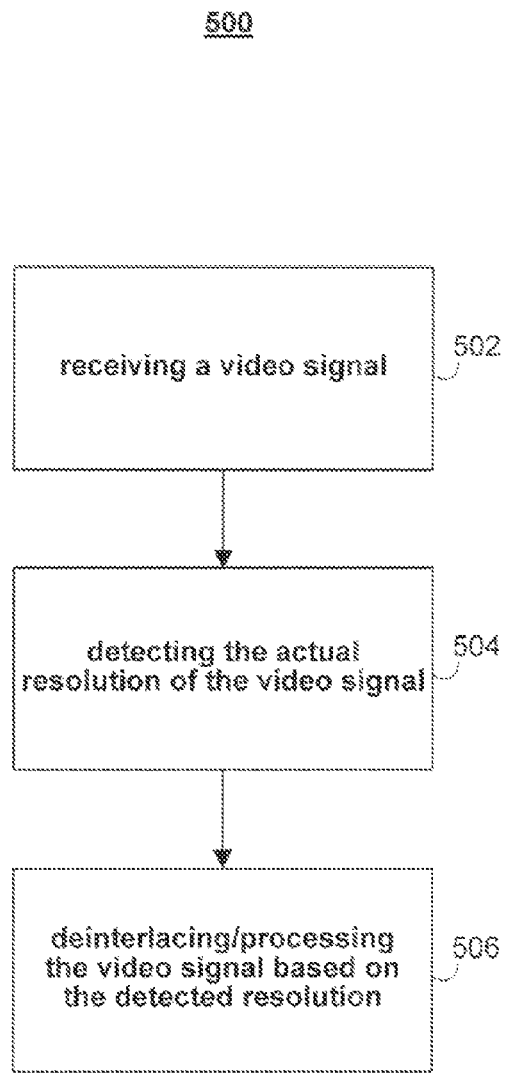
FIGS. 5-6 are illustrative flow diagrams for processing a low-resolution video signal.

Flow diagram 500 in FIG. 5 shows illustrative steps that video format converter 410 (FIG. 4) may take to deinterlace and process a video signal. Video converter 410 receives a video signal at step 502. The video signal may be of any suitable format. At step 504, video converter 410 may detect the resolution of the video signal. In some embodiments, video converter 410 may only take video input from a particular type or brand of a video providing device. For example, dock 408 (FIG. 4) may include an interface that is shaped to fit one type of device, or video converter 410 may be embedded in a particular video providing device. In these embodiments, resolution detection at step 504 may be simpler, since the resolution may be hard-coded or hard-wired based on the known encoding of the video providing device. Further proprietary or other more advanced connections may include embedded resolution information. In some embodiments, and for certain types of products, the resolution information could also be provided in response to a user input, such as in response to the user explicitly selecting content of particular resolutions. For example, when downloading online content, one can often explicitly choose which resolution to download the online content. For the example discussed in connection with FIG. 3, video format converter 410 may be hard-wired or hard-coded to expect the resolution of every transmitted video to be 320×240, or equivalently, to expect the actual resolution to be half of the transmitted resolution.

In other embodiments of system 400 in FIG. 4, video format converter 410 may be used for a plurality of video providing devices. Therefore, the resolution or scaling factor of the video signal received at step 502 in flow diagram 500 (FIG. 5) may vary. In this case, resolution detection of the video signal at step 504 is more complex. The video converter may, for example, have a front-end circuit that detects pixel replication in the video signal. The detector may compare vertically and/or horizontally neighboring pixels, or the detector may compare a number of surrounding pixels. The pixel radius, or a similar metric, that is used for a given comparison may be programmable. Furthermore, a threshold for the percentage of pixels that should match in order to form a confident determination of the resolution may also be programmable. For the example discussed above in connection with FIG. 3, video converter 410 may detect that the received 640×480 video signal actually has a resolution of 320×240. If a cell phone with a resolution of 160×120 is coupled to video converter 410 instead, video converter 410 may detect the true resolution or detect that the true resolution is one-fourth of the transmitted resolution (assuming again that the transmitted resolution is 640×480).

At step 506 in FIG. 5, the received video signal may be deinterlaced. The video signal may be deinterlaced in its transmitted resolution regardless of any discrepancies between the transmitted and the actual resolution. However, the technique used to deinterlace the video signal may be selected based on the detected resolution. For the example as discussed in connection with FIG. 3, the transmitted, 640×480-resolution video may be directly deinterlaced by video converter 410, and 2D deinterlacing may be used because of the detected, 320×240 resolution. In other scenarios, deinterlacing may involve other forms of 2D deinterlacing, some form of 3D deinterlacing, or any other deinterlacing technique. An advanced form of 3D deinterlacing is discussed in greater detail in U.S. patent application Ser. No. 11/932,686, which is hereby incorporated by reference herein in its entirety.

Figure 7:
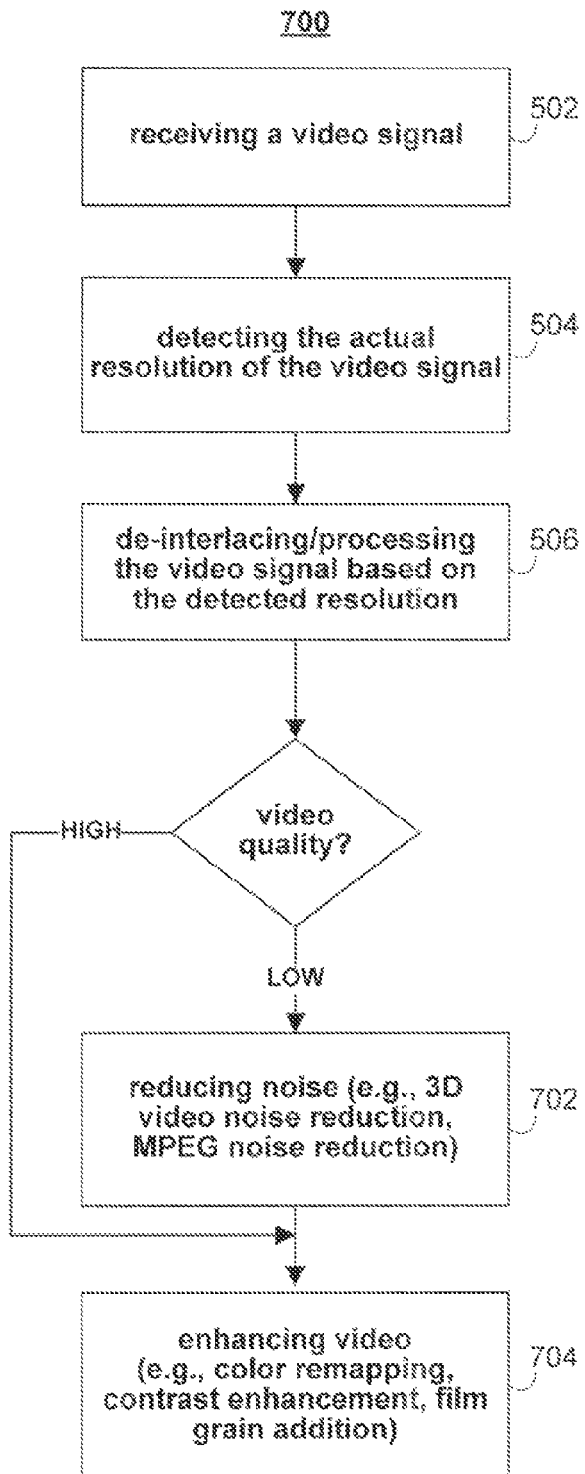
FIGS. 7-8 are illustrative flow diagrams for improving the visual quality of a low-resolution video.
Figure 8:
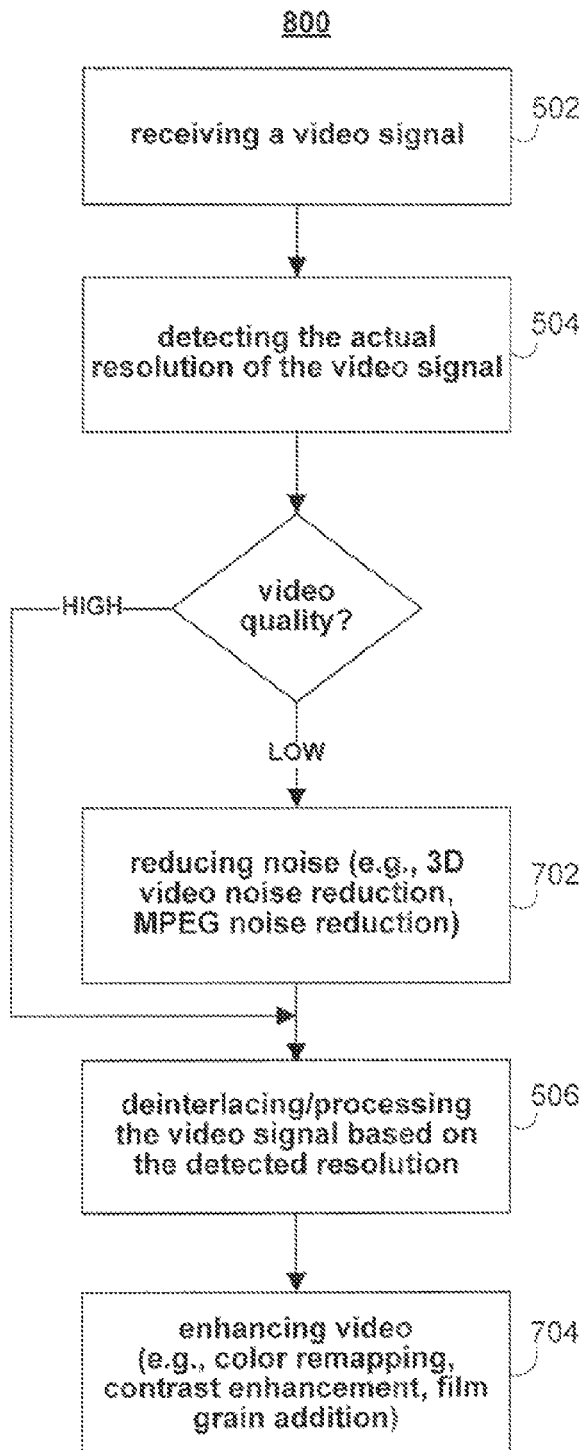

Deinterlacing at step 506 in FIG. 5 may additionally involve scaling the video to an image size suitable for display on a television or other large-screen display device (e.g., display device 104). For example, video converter 410 may scale a 640×480 video to the resolution of display screen 114, which, for example, may have a resolution of 1280×720 or 1920×1080. Video converter 410 may perform frame-rate conversion. That is, when a video signal is being converted from one standard to another (e.g., NTSC to PAL), video converter 410 may adjust the frame rate in accordance with the specifications of the standards. In situations where the received video signal is already in a progressive format, video format converter 410 may not need to deinterlace the video signal, and may instead perform other processing steps, such as scaling the video and/or performing frame-rate conversion. For example, if the original content is determined to be progressive 320×240 at 30 frames per second, but display screen 114 is 1280×720 at 60 frames per second, converter 410 may be scale the video signal to 1280×720 using vector interpolation and convert it to 60 frames per second by repeating every frame once. Alternatively, frame-rate conversion by converter 410 may involve a more advanced form of frame-rate conversion, such as motion-compensated frame-rate conversion. Frame-rate conversion, and more particularly motion-compensated frame-rate conversion, and its functionalities are described in greater detail in Biswas, et al. U.S. patent application Ser. No. 11/803,535, which is hereby incorporated by reference herein in its entirety. Video converter 410 may process the video signal in other ways. Additional processing may include any of the techniques discussed below in connection with steps 702 and 704 in flow diagrams 700 and 800 (FIGS. 7 and 8). These techniques may be chosen based on the detected resolution of the video signal.

Figure 6:
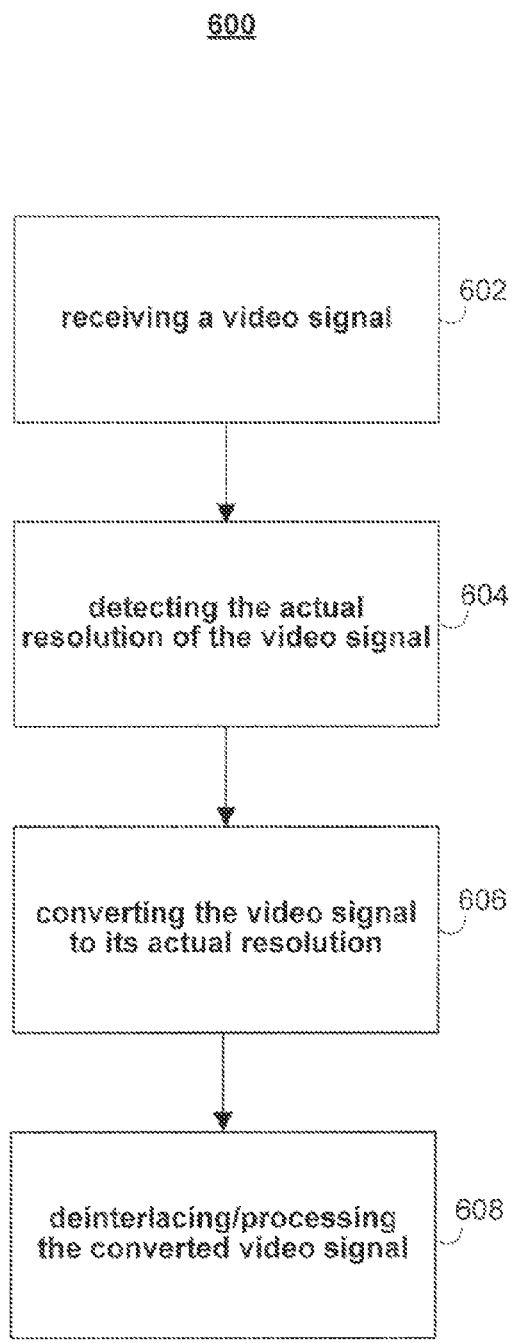

Flow diagram 600 in FIG. 6 shows alternative steps that may be taken by video format converter 410 (FIG. 4) to deinterlace and process a video signal. At step 602, a video signal is received from a video providing device. The video signal may be of any suitable format. At step 604, the resolution of the video is determined. Detection or determination of the video resolution may occur using any of the techniques discussed in connection with step 504 of flow diagram 500 (FIG. 5). After determining the video resolution, video converter 410 may convert the video signal to its actual resolution at step 606. For the example discussed in connection with FIG. 3, video converter 410 may revert the transmitted 640×480 video signal to a 320×240 video signal. Video converter 410 may undo any pixel replications performed by the video providing device, thereby recovering the original video signal. Video converter 410 may ignore pixels that it determines are replications of other pixels, or video converter 410 may perform another processing technique that recovers a video signal with its true resolution.

After obtaining a video signal with its original resolution at step 606, video converter 410 (FIG. 3) may deinterlace and process the converted video signal at step 608. Since the video signal is in its proper resolution, a deinterlacer may choose a deinterlacing technique that is best suited for scaling a video from its original, true resolution (e.g., 320×240 for the image in FIG. 4) to the final resolution of a display screen (e.g., display screen 114). Deinterlacing at step 608 may involve any of the types of deinterlacing (e.g., 2D, 3D, etc.) discussed above in connection with step 506 of flow diagram 500 (FIG. 5). Additional processing may also be applied to the video signal, including any of the techniques discussed below in connection with steps 702 and 704 in flow diagrams 700 and 800 (FIGS. 7 and 8). Any of these techniques may be chosen based on the true resolution of the video.

FIGS. 7 and 8 show illustrative flow diagrams 700 and 800 for improving the appearance of a low-resolution video on a large-screen display. In FIG. 7, additional processing steps are performed following deinterlacing at step 506. Although flow diagram 700 shows deinterlacing using the steps from flow diagram 500 (FIG. 5), the steps in flow diagram 600 (FIG. 6) may be used instead (e.g., by replacing steps 502 through 506 in FIG. 7 with steps 604 through 608). The particular processing techniques that are performed on a video may depend on whether the video is high-quality (e.g., professionally-generated, low-resolution video on the Internet, videos from portable media player 208, etc.) or low-quality (e.g., amateur-generated videos on the Internet, highly compressed videos, etc.). The quality of a video may be determined in any suitable way. The quality may be hard-coded or hard-wired if, for example, dock 408 takes input from only one type of video providing device, and the video-providing device typically provides substantially the same quality video. Alternatively, a suitable metric for assessing the quality of a video may be determined. The video may be considered high-quality if the calculated metric is higher than a certain threshold.

Low-quality videos may suffer from artifacts such as blocking artifacts and mosquito noise. Blocking artifacts refer to the blocky appearance of a low resolution video that is typically seen on areas of less detail in the image. Mosquito noise is a ringing effect, caused by truncating high-frequency luminance and/or chrominance coefficients, typically seen around sharp edges in the video. These and other artifacts may be caused from amateur recording and/or encoding techniques (e.g., using non-ideal compression settings, holding a hand-held camera instead of using a tripod, etc.).

For low-quality videos, the compression artifacts may be reduced at step 702 (e.g., by converter 410 in FIG. 4). Artifact reduction at step 702 may involve reducing one or more types of artifacts (e.g., mosquito noise, blocking artifacts, etc.). Artifacts may be reduced using one or more hardware-based or software-based modules. One or more types of artifacts may be reduced by combining different noise-reducing techniques into a single module, by cascading various noise-reducing modules, or using any other suitable technique. In some embodiments, block and mosquito noise reduction may be used at step 702. This can be referred to as "MPEG noise reduction," but its application is useful for any compression scheme based on a discrete cosine transform (DCT), including H.264, VC-1, MPEG4, and MPEG2. In some embodiments, 3D video noise reduction may be used to reduce both temporal and spatial noise. The amount of noise reduction performed at step 702 (e.g., the number of noise reducing techniques used, the degree to which each technique is used, etc.) may depend on the assessment of the quality of the video. MPEG noise reduction and 3D video noise reduction are described in greater detail in Pathak U.S. patent application Ser. No. 11/521,927 and Pathak et al. U.S. patent application Ser. No. 11/400,505, respectively, which are hereby incorporated by reference herein in their entirety. Each disclosure also describes a way to assess the quality of the video. The former has a blockiness and mosquito noise measurement, and the latter has automatic noise estimation. Either, both, or any other suitable measurement may be used to determine whether a video is high- or low-quality and/or to determine the amount of noise reduction necessary.

As described above, prior to noise reduction at step 702, the video signal may include true information about the video content as well as noise. Because of the poor quality of the video signal, a disproportionate amount of the video information in the signal may be noise information rather than true video information. Thus, after this noise is reduced at step 702, a disproportionate amount of the original information may be reduced or even completely removed. Thus, displaying only the remaining information may not create a pleasant picture, as there may be very little detail. For example, a low-quality video that was taken by a hand-held camera may have a moving picture caused by a shaking camera, even if the background or other parts of the picture are substantially unmoving for successive images. Thus, when the video is compressed, inter-frame compression techniques that would otherwise notice that the fields/frames are unchanging may not be as effective. For a given data rate or file size, extra bits are used to capture the shaking "noise," leaving fewer bits for detail and other actual information. Noise reduction may reduce the noise caused by the shaking camera, effectively reducing or removing information from the video signal. Thus, if the remaining information is displayed to a user, there may not be enough video information to create a pleasing display. For example, the resulting video may have blurred edges, since the original edges were noisy and removed. Similarly, the resulting video may have low contrast. In general, once artifacts are removed from noisy areas of the picture, there may be very little detail left in those areas.

Accordingly, following noise reduction at step 702, the video signal is enhanced at step 704 (e.g., by converter 410 in FIG. 4). Video enhancement at step 704 may involve enhancing different aspects of the video (e.g., the edges, the color/light contrasts, etc.). Video enhancement may occur using one or more hardware-based or software-based modules. One or more aspects of the video may be enhanced by combining different video-enhancing techniques into a single module, by cascading various video-enhancing modules, or using any other suitable technique. In some embodiments, video enhancement may involve color remapping. That is, certain colors in a video may be mapped into other shades or other colors. For example, certain shades of green that typically correspond to the color of grass may be remapped to a more vibrant, healthier-looking shade of green. In some embodiments, video enhancement may involve changing the contrast of colors or light. For example, to make a picture more vivid, a video processor may increase the lighting contrast. Color remapping and video contrast enhancement, and their functionalities, are discussed in greater detail in Srinivasan et al. U.S. patent application Ser. No. 11/296,163 and Srinivasan et al. U.S. patent application Ser. No. 11/295,750, respectively, which are hereby incorporated by reference herein in their entirety.

Video enhancement at step 704 may involve adding film grain. Film grain is a high-frequency noise that is naturally present in film, but not in digital video. It is referred to herein as a noise source of any distribution and magnitude that may be added to a video signal. Typically, film grain is generated by a film grain generator and added to high-definition digital video. Film grain on high-definition, digital video is used to create a softer, creamier feeling in the picture that is characteristic of film. This is often accomplished by adding a spatio-temporal noise pattern, a particularly effective way to create "perceptual masking," which involves the reduction of visual acuity. For low-resolution video, on the other hand, the addition of film grain may establish the look of texture in a blurred image. Adding film grain may create the illusion that there is detail in the picture, even though, due to low resolution and noise reduction at step 702, there actually may be very little detail. Film grain may be added to cover up remaining artifacts or other areas of poor visual quality. For example, if a noise pattern with high spatio-temporal frequencies is used, "perceptual masking" may cause viewers to be less aware or bothered by the remaining artifacts. Film grain generation and addition, and its functionalities, are discussed in greater detail in Balram et al. U.S. patent application Ser. No. 11/313,577, which is hereby incorporated by reference herein in its entirety.

Videos that are high-quality but low-resolution (e.g., professional-generated videos from the Internet) may also be enhanced according to the techniques described above in connection with step 704. Step 702 may often be skipped, because professionally-generated videos typically do not suffer from substantial compression artifacts. The above-described techniques for video enhancement, or any other suitable technique, may be used to cover up deficiencies, to simulate detail, to smoothen blocky areas, to add contrast to the picture, or to provide any other enhancement that may increase the viewing pleasure of a low-resolution video (e.g., 320×240 video from portable media player 208) on a large-screen display (e.g., display screen 114 with 1280×720 resolution).

Referring now to FIG. 8, illustrative flow diagram 800 shows an alternative embodiment for improving the visual quality of a video. Note that the steps in flow diagram 800 are the same as those in flow diagram 700 (FIG. 7), but arranged in a different order. Although flow diagram 800 shows deinterlacing using the steps from flow diagram 500 (FIG. 5), the steps in flow diagram 600 (FIG. 6) may be used instead (e.g., by replacing steps 502 and 504 with steps 602 through 606 and step 506 with step 608). Flow diagram 800 shows that deinterlacing does not necessarily occur before the additional processing steps. In particular, deinterlacing step 506 is shown in flow diagram 800 to occur between processing steps 702 and 704. However, it should be understood that deinterlacing may be performed at any time relative to each noise reduction and video enhancement technique associated with steps 702 and 704. That is, flow diagram 800 may be altered such that any of the noise reduction techniques associated with step 702 may be performed at the same time or after deinterlacing (for low-quality videos), and any of the video enhancement techniques associated with step 704 may be performed at the same time or prior to deinterlacing. Thus, deinterlacing step 506 may also follow processing step 704.

Referring now to FIGS. 9A-9G, various exemplary implementations of the present invention are shown.

Figure 9A:
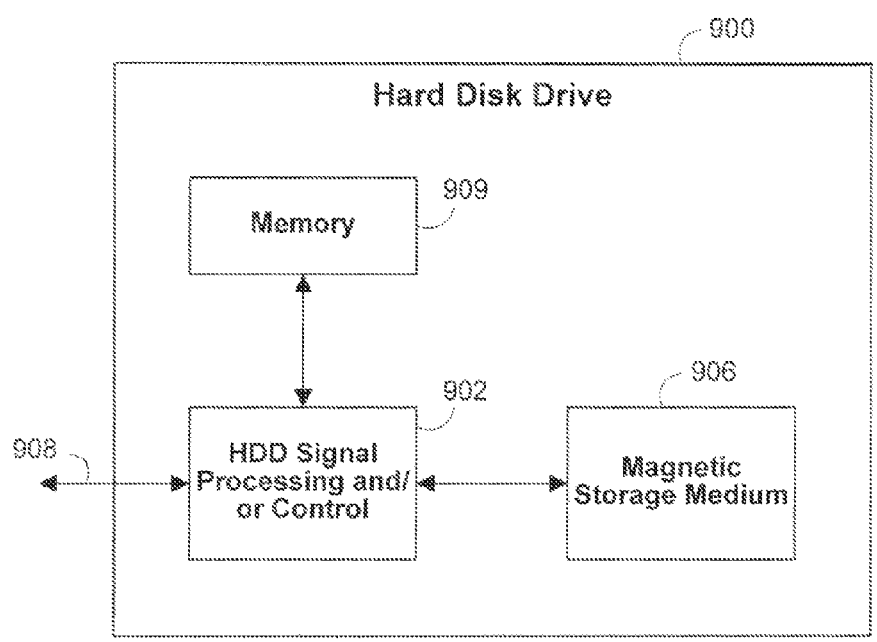
FIG. 9A is a block diagram of an exemplary hard disk drive that can employ the disclosed technology.

Referring now to FIG. 9A, the present invention can be implemented in a hard disk drive 900. The present invention may be implemented as part of the signal processing and/or control circuits, which are generally identified in FIG. 9A at 902. In some implementations, the signal processing and/or control circuit 902 and/or other circuits (not shown) in the HDD 900 may process data, perform coding and/or encryption, perform calculations, and/or format data that is output to and/or received from a magnetic storage medium 906.

The HDD 900 may communicate with a host device (not shown) such as a computer, mobile computing devices such as personal digital assistants, cellular phones, media or MP3 players and the like, and/or other devices via one or more wired or wireless communication links 908. The HDD 900 may be connected to memory 909 such as random access memory (RAM), nonvolatile memory such as flash memory, read only memory (ROM) and/or other suitable electronic data storage.

Figure 9B:
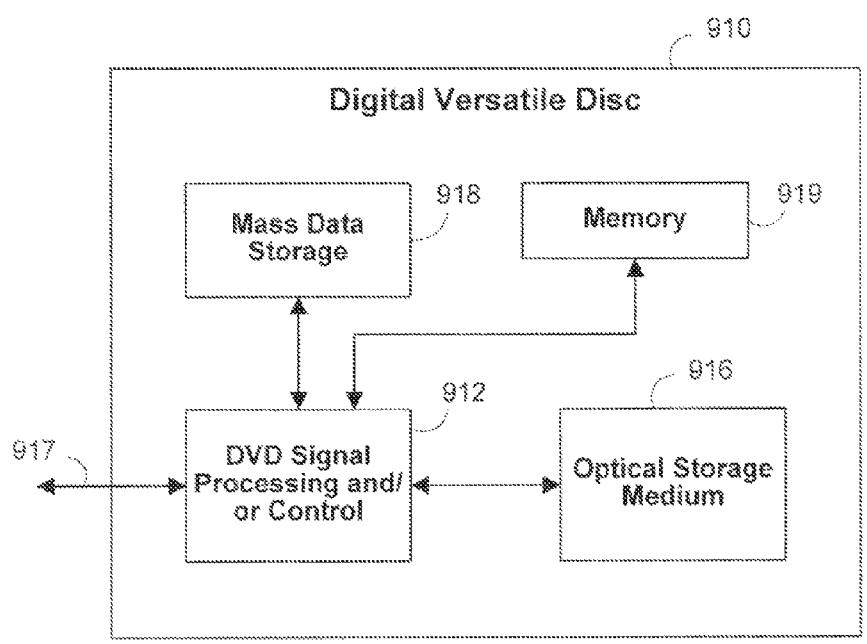
FIG. 9B is a block diagram of an exemplary digital versatile disc that can employ the disclosed technology.

Referring now to FIG. 9B, the present invention can be implemented in a digital versatile disc (DVD) drive 910. The present invention may be implemented as part of the signal processing and/or control circuits, which are generally identified in FIG. 9B at 912, and/or mass data storage 918 of the DVD drive 910. The signal processing and/or control circuit 912 and/or other circuits (not shown) in the DVD 910 may process data, perform coding and/or encryption, perform calculations, and/or format data that is read from and/or data written to an optical storage medium 916. In some implementations, the signal processing and/or control circuit 912 and/or other circuits (not shown) in the DVD 910 can also perform other functions such as encoding and/or decoding and/or any other signal processing functions associated with a DVD drive.

The DVD drive 910 may communicate with an output device (not shown) such as a computer, television or other device via one or more wired or wireless communication links 917. The DVD 910 may communicate with mass data storage 918 that stores data in a nonvolatile manner. The mass data storage 918 may include a hard disk drive (HDD). The HDD may have the configuration shown in FIG. 9A. The HDD may be a mini HDD that includes one or more platters having a diameter that is smaller than approximately 1.8". The DVD 910 may be connected to memory 919 such as RAM, ROM, nonvolatile memory such as flash memory and/or other suitable electronic data storage.

Figure 9C:
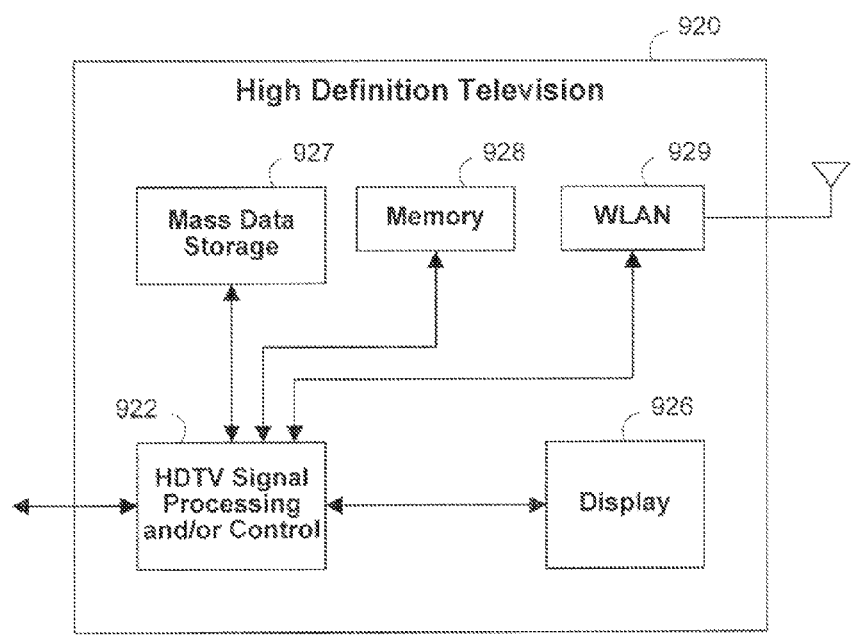
FIG. 9C is a block diagram of an exemplary high definition television that can employ the disclosed technology.

Referring now to FIG. 9C, the present invention can be implemented in a high definition television (HDTV) 920. The present invention may be implemented as part of the signal processing and/or control circuits, which are generally identified in FIG. 9C at 922, a WLAN interface 929 and/or mass data storage 927 of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The HDTV 920 may be connected to memory 928 such as RAM, ROM, nonvolatile memory such as flash memory and/or other suitable electronic data storage. The HDTV 920 also may support connections with a WLAN via a WLAN network interface 929.

Figure 9D:
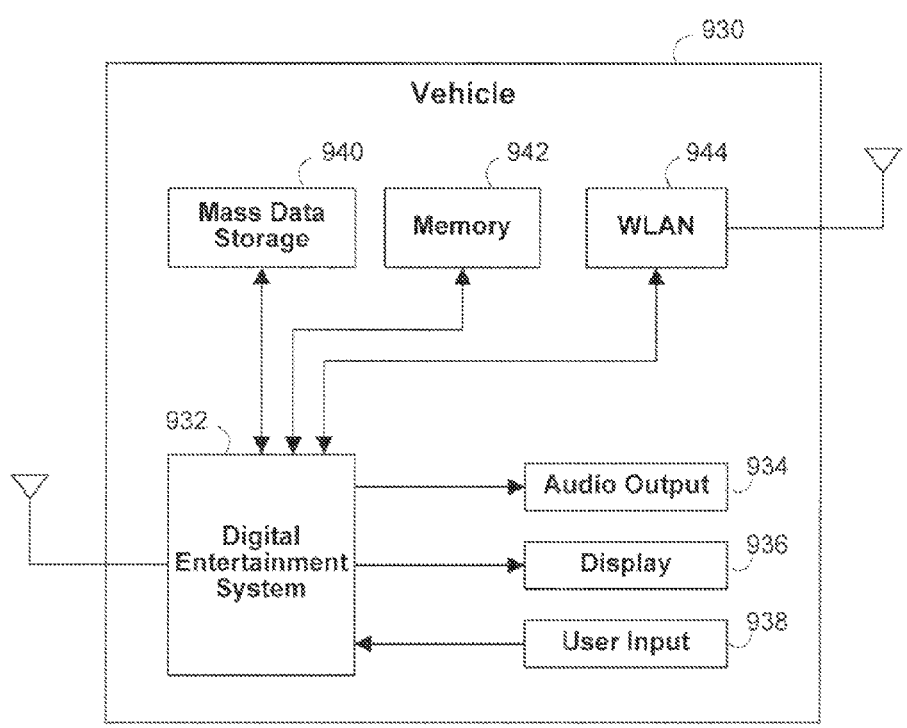
FIG. 9D is a block diagram of an exemplary vehicle that can employ the disclosed technology.
Figure 9E:
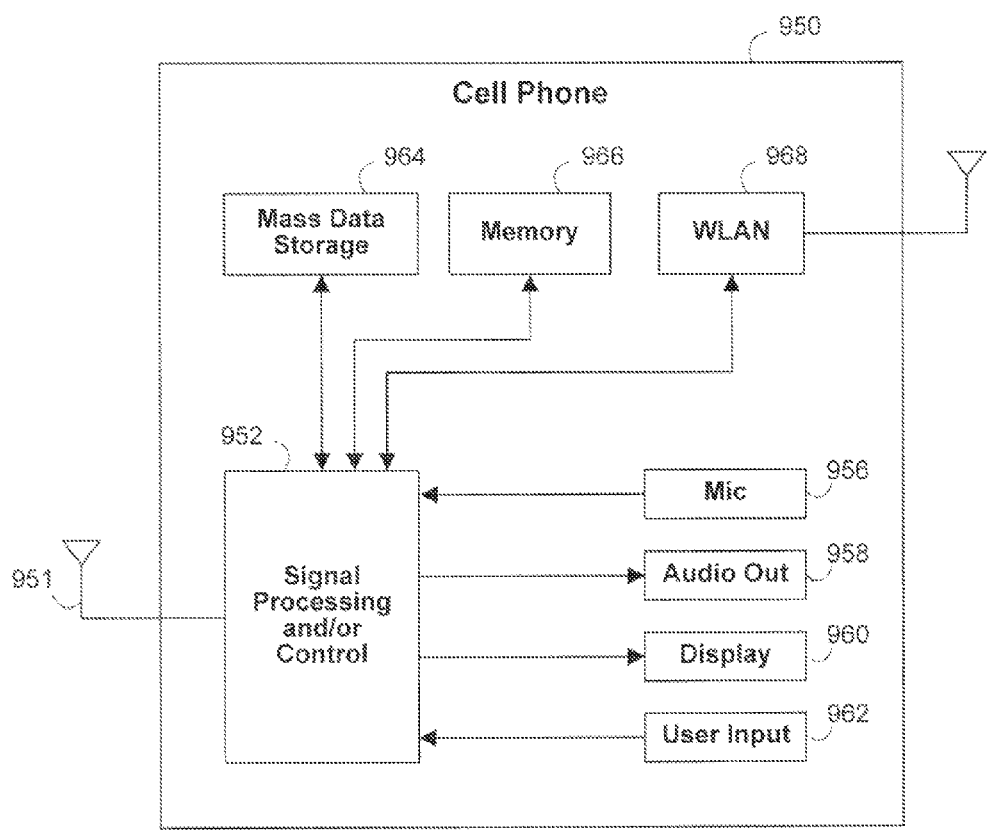
FIG. 9E is a block diagram of an exemplary cell phone that can employ the disclosed technology.

Referring now to FIG. 9D, the present invention may be implemented in a digital entertainment system 932 of a vehicle 930, which may include a WLAN interface 944 and/or mass data storage 940.

The digital entertainment system 932 may communicate with mass data storage 940 that stores data in a nonvolatile manner. The mass data storage 940 may include optical and/or magnetic storage devices such as hard disk drives (HDDs) and/or DVD drives. The HDD may be a mini HDD that includes one or more platters having a diameter that is smaller than approximately 1.8". The digital entertainment system 932 may be connected to memory 942 such as RAM, ROM, nonvolatile memory such as flash memory and/or other suitable electronic data storage. The digital entertainment system 932 also may support connections with a WLAN via the WLAN interface 944. In some implementations, the vehicle 930 includes an audio output 934 such as a speaker, a display 936 and/or a user input 938 such as a keypad, touchpad and the like Referring now to FIG. 9E, the present invention can be implemented in a cellular phone 950 that may include a cellular antenna 951. The present invention may be implemented as part of the signal processing and/or control circuits, which are generally identified in FIG. 9E at 952, a WLAN interface 968 and/or mass data storage 964 of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The cellular phone 950 may be connected to memory 966 such as RAM, ROM, nonvolatile memory such as flash memory and/or other suitable electronic data storage. The cellular phone 950 also may support connections with a WLAN via a WLAN network interface 968.

Figure 9F:
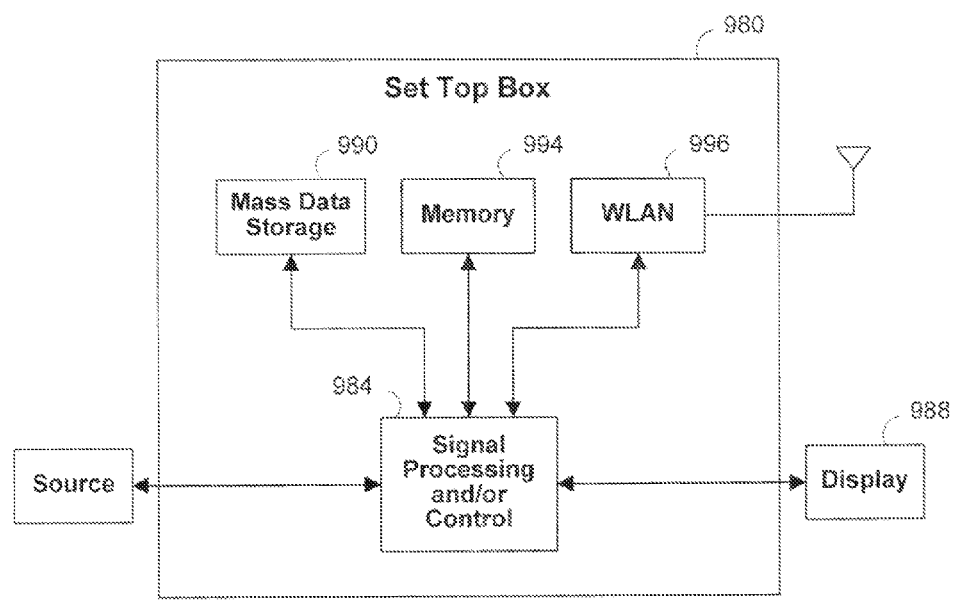
FIG. 9F is a block diagram of an exemplary set top box that can employ the disclosed technology.

Referring now to FIG. 9F, the present invention can be implemented in a set top box 980. The present invention may be implemented as part of the signal processing and/or control circuits, which are generally identified in FIG. 9F at 984, a WLAN interface 996 and/or mass data storage 990 of the set top box 980. The set top box 980 receives signals from a source such as a broadband source and outputs standard and/or high definition audio/video signals suitable for a display 988 such as a television and/or monitor and/or other video and/or audio output devices. The signal processing and/or control circuits 984 and/or other circuits (not shown) of the set top box 980 may process data, perform coding and/or encryption, perform calculations, format data and/or perform any other set top box function.

The set top box 980 may communicate with mass data storage 990 that stores data in a nonvolatile manner. The mass data storage 990 may include optical and/or magnetic storage devices, for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The set top box 980 may be connected to memory 994 such as RAM, ROM, nonvolatile memory such as flash memory and/or other suitable electronic data storage. The set top box 980 also may support connections with a WLAN via a WLAN network interface 996.

Figure 9G:
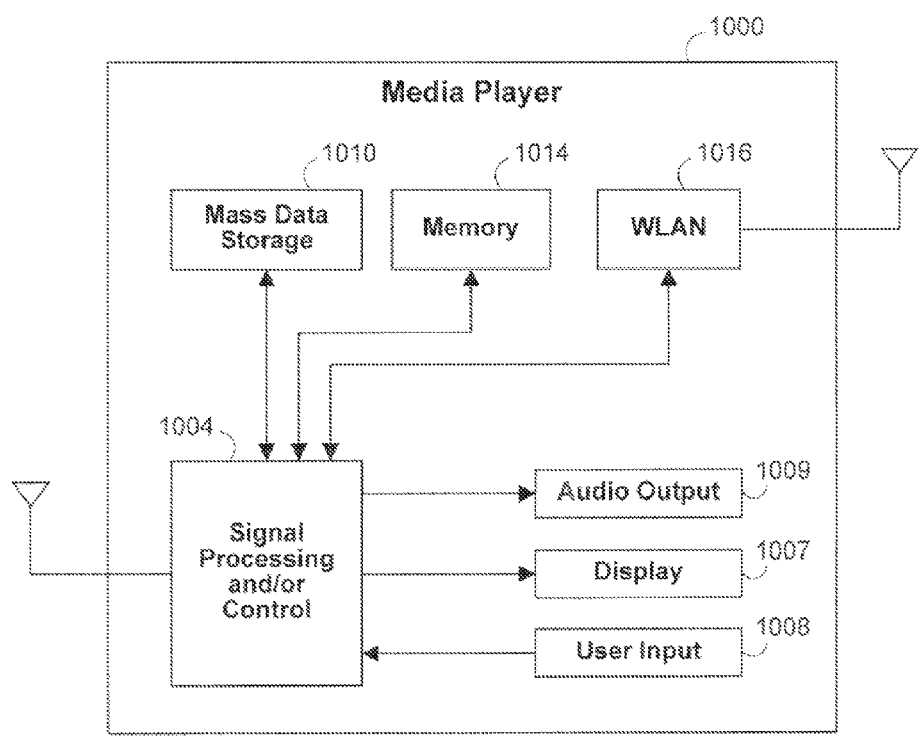
FIG. 9G is a block diagram of an exemplary media player that can employ the disclosed technology.

Referring now to FIG. 9G, the present invention can be implemented in a media player 1000. The present invention may be implemented as part of the signal processing and/or control circuits, which are generally identified in FIG. 9G at 1004, a WLAN interface 1016 and/or mass data storage 1010 of the media player 1000. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage 1010 may include optical and/or magnetic storage devices for example hard disk drives HDD and/or DVDs. At least one HDD may have the configuration shown in FIG. 9A and/or at least one DVD may have the configuration shown in FIG. 9B. The HDD may be a mini HDD that includes one or more platters having a diameter that is smaller than approximately 1.8". The media player 1000 may be connected to memory 1014 such as RAM, ROM, nonvolatile memory such as flash memory and/or other suitable electronic data storage. The media player 1000 also may support connections with a WLAN via a WLAN network interface 1016. Still other implementations in addition to those described above are contemplated.

The foregoing describes systems and methods for improving the visual quality of low-resolution video on large-screen displays. The above described embodiments of the present invention are presented for the purposes of illustration and not of limitation.

What is claimed is:

1. A method of processing video content for display on a video display, the method comprising:
   receiving a video signal having a received resolution;
   detecting an actual resolution of the received video signal, wherein the actual resolution differs from the received resolution; and
   processing the received video signal, wherein the processing comprises selecting an appropriate one of a plurality of deinterlacing techniques based on the actual resolution.

2. The method of claim 1, wherein processing the received video signal comprises deinterlacing the received video signal using the selected deinterlacing technique.

3. The method of claim 1 further comprising:
   reducing artifacts in the received video signal; and
   enhancing the received video signal.

4. The method of claim 1 further comprising:
   scaling the received video signal to a second resolution based on the actual resolution, wherein the second resolution corresponds to a resolution of the video display; and
   displaying the scaled video signal on the video display.

5. The method of claim 4, wherein scaling the received video signal comprises:
   converting the received video signal to a video signal with the actual resolution; and
   scaling the converted video signal to a video signal with the second resolution.

6. A method of processing video content for display on a video display, the method comprising:
   receiving a video signal having a received resolution;
   detecting an actual resolution of the received video signal, wherein the actual resolution differs from the received resolution; and
   processing the received video signal, wherein the processing comprises selecting an appropriate one of a plurality of noise reduction techniques based on the actual resolution.

7. The method of claim 6, wherein processing the received video signal comprises reducing artifacts in the received video signal using the selected noise reduction technique.

8. The method of claim 6, further comprising deinterlacing the received video signal.

9. The method of claim 6 further comprising:
   scaling the received video signal to a second resolution based on the actual resolution, wherein the second resolution corresponds to a resolution of the video display; and
   displaying the scaled video signal on the video display.

10. The method of claim 9, wherein scaling the received video signal comprises:
    converting the received video signal to a video signal with the actual resolution; and
    scaling the converted video signal to a video signal with the second resolution.

11. A system for processing video content for display on a video display, the system comprising:
    a receiver configured to receive a video signal having a received resolution;
    detection circuitry configured to detect an actual resolution of the received video signal, wherein the actual resolution differs from the received resolution; and
    processing circuitry configured to select an appropriate one of a plurality of deinterlacing techniques based on the actual resolution and to process the received video signal.

12. The system of claim 11, wherein the processing circuitry is further configured to deinterlace the received video signal using the selected deinterlacing technique.

13. The system of claim 11, wherein the processing circuitry is further configured to:
    reduce artifacts in the received video signal; and
    enhance the received video signal.

14. The system of claim 11, wherein the processing circuitry is further configured to:
    scale the received video signal to a second resolution based on the actual resolution, wherein the second resolution corresponds to a resolution of the video display; and
    display the scaled video signal on the video display.

15. The system of claim 11, wherein the processing circuitry is further configured to:
- convert the received video signal to a video signal with the actual resolution; and
- scale the converted video signal to a video signal with a second resolution, wherein the second resolution corresponds to a resolution of the video display.

16. A system for processing video content for display on a video display, the system comprising:
- a receiver configured to receive a video signal having a received resolution;
- detection circuitry configured to detect an actual resolution of the received video signal, wherein the actual resolution differs from the received resolution; and
- processing circuitry configured to select an appropriate one of a plurality of noise reduction techniques based on the actual resolution and to process the received video signal.

17. The system of claim 16, wherein the processing circuitry is further configured to reduce artifacts in the received video signal using the selected noise reduction technique.

18. The system of claim 16, wherein the processing circuitry is further configured to deinterlace the received video signal.

19. The system of claim 16, wherein the processing circuitry is further configured to:
- scale the received video signal to a second resolution based on the actual resolution, wherein the second resolution corresponds to a resolution of the video display; and
- display the scaled video signal on the video display.

20. The system of claim 16, wherein the processing circuitry is further configured to:
- convert the received video signal to a video signal with the actual resolution; and
- scale the converted video signal to a video signal with a second resolution, wherein the second resolution corresponds to a resolution of the video display.

* * * * *